FIG_1_

FIG_2_

2,893,840

Patented July 7, 1959

2,893,840

PRODUCTION OF MAGNESIUM COMPOUND

Arthur W. Vettel, Watsonville, Calif., and Robert D. Israel, Baton Rouge, La., assignors to Kaiser Aluminum & Chemical Corporation, Oakland, Calif., a corporation of Delaware Application December 15, 1955, Serial No. 553,268

12 Claims. (Cl. 23—201)

This invention relates to the production of magnesium hydroxide by precipitation thereof from magnesium salt brine; and more particularly, by reacting magnesium chloride brine with dry calcined dolomite.

Magnesium salt brines, for example, inland brines, bitterns and various by-product liquors, have been known as good raw materials for the production of magnesium hydroxide and magnesia. It is particularly useful to obtain these products by reaction of the brine with calcined dolomite, dolomite lime or magnesian lime, because thereby the magnesium values of the ores are also recovered. However, it has been difficult to recover a magnesium hydroxide or oxide which is essentially free of lime; and for a number of uses, such as high temperature or heavy duty magnesia-containing refractories, the presence of any appreciable amount of lime is quite undesirable. A further difficulty with processes as hitherto known has been to recover a low-lime product with simultaneous high yield of the magnesium product desired. It is particularly desirable to reduce the lime content to below 1%, ignited basis, in magnesium hydroxide made by reacting magnesium chloride brine with dry calcined dolomite. Also, it is desired to obtain a final slurry of high density, or, in other words, which has a high content of suspended magnesium hydroxide, and a filter cake which has a high solids content.

According to the present invention it has now been found that high purity magnesium hydroxide of excellent settling and filtering characteristics is produced by reacting concentrated aqueous magnesium salt solution, such as magnesium chloride brine, with dry calcined dolomite by a method wherein there are provided two reaction zones in series. The invention will be described with respect to reacting magnesium chloride brine. A major portion of the brine required to react stoichiometrically with the lime of the feed is added in the first reactor and the remaining minor portion of the brine is added in the second reactor. In the process, vigorous agitation is effected in the first reactor and the MgCl₂ of the brine reacts with part of the lime to form magnesium hydroxide, which precipitates, according to the following equation:

$$MgCl_2 + CaO + H_2O \rightarrow Mg(OH)_2 + CaCl_2$$

The remainder of the lime available for reaction is reacted in the second reaction zone with the MgCl₂ of the brine added therein. At the same time, in both zones, the MgO of the calcined dolomite is hydrated to form magnesium hydroxide. The partially reacted material from the first reaction zone is a slurry of magnesium hydroxide and unreacted calcined dolomite in substantially spent brine, and this slurry is withdrawn to the second reaction zone wherein the remainder, or minor portion, of the brine is added to react substantially stoichiometrically with the remaining unreacted lime of the dolomite. Preferably, from 1% to 15% of the total brine required is added in the second reaction zone wherein agitation is less vigorous, or more gentle, than in the first reaction zone.

The reacted materials are withdrawn from the second reaction zone as a slurry of magnesium hydroxide crystals in spent brine and thereafter the magnesium hydroxide is separated from the brine. The slurry is introduced into a thickening zone where the crystals settle toward the bottom and are withdrawn as a thick slurry at the base of the zone, and the spent brine is withdrawn as overflow. The crystals settle very well and the thickened slurry can if desired be directly filtered and the cake washed on the filter. However, it is sometimes advantageous to provide a series of thickening zones and to wash the slurry by a counter-current flow of fresh water in these zones. The washed slurry is thereafter filtered and, if desired, is subjected to further washing on the filter. It is especially advantageous in this process to apply mechanical pressure intermittently to the filter cake because this enables greater de-watering, as will be further explained below.

In the annexed drawings, which illustrate some embodiments of the present invention:

The alkaline dry feed reactant which is introduced into the first reaction zone to form Mg(OH)₂ with the magnesium chloride of the brine is dry calcined dolomite, and this term is intended to include besides dolomite also magnesian lime and dolomite lime. The calcine can be a hard burned product, such as is obtained by shaft kiln firing, when the raw ore is of high purity. When an ore is employed which contains appreciable amounts of impurities, especially silica or silicates or both, the temperature of calcination preferably does not exceed about 1200° C. in order to prevent reaction of the lime with the impurities and consequent loss of activity and of available CaO. An example of the first mentioned, or high purity, ore is dolomite obtained from the deposits at Woodville, Ohio, which has a typical analysis as follows, on the ignited basis: 58.40% CaO, 41.07% MgO, 0.19% $SiO_2$, 0.08% $Fe_2O_3$, 0.07% $Al_2O_3$, 0.17% $SO_3$, and 0.012% MnO, the remainder comprising traces of $P_2O_5$ and SrO. An example of the second-mentioned decrepitating ore of higher impurity content is that obtained from deposits at Natividad, California, which has a typical analysis as follows, on the ignited basis: 38.06% MgO, 59.66% CaO, 1.60% $SiO_2$, 0.33% $Fe_2O_3$, 0.34% $Al_2O_3$, (the remaining 0.01% comprising traces of undetermined substances such as manganese oxide, $P_2O_5$, etc.). The Natividad dolomite is a decrepitating ore, i.e. it tends to burst upon heating, and, when calcined at 1100–1200° C., it has also the characteristic of exhibiting substantial spontaneous dispersion in a magnesium salt solution. Other dolomites are useful as sources of solid reactant in this process but the above are illustrative of the high purity type, that is, containing on the ignited basis at least 99% of CaO plus MgO and less than 0.5% silica, and on the other hand of the lower purity ore especially as containing over 1% silica.

Figure 3:
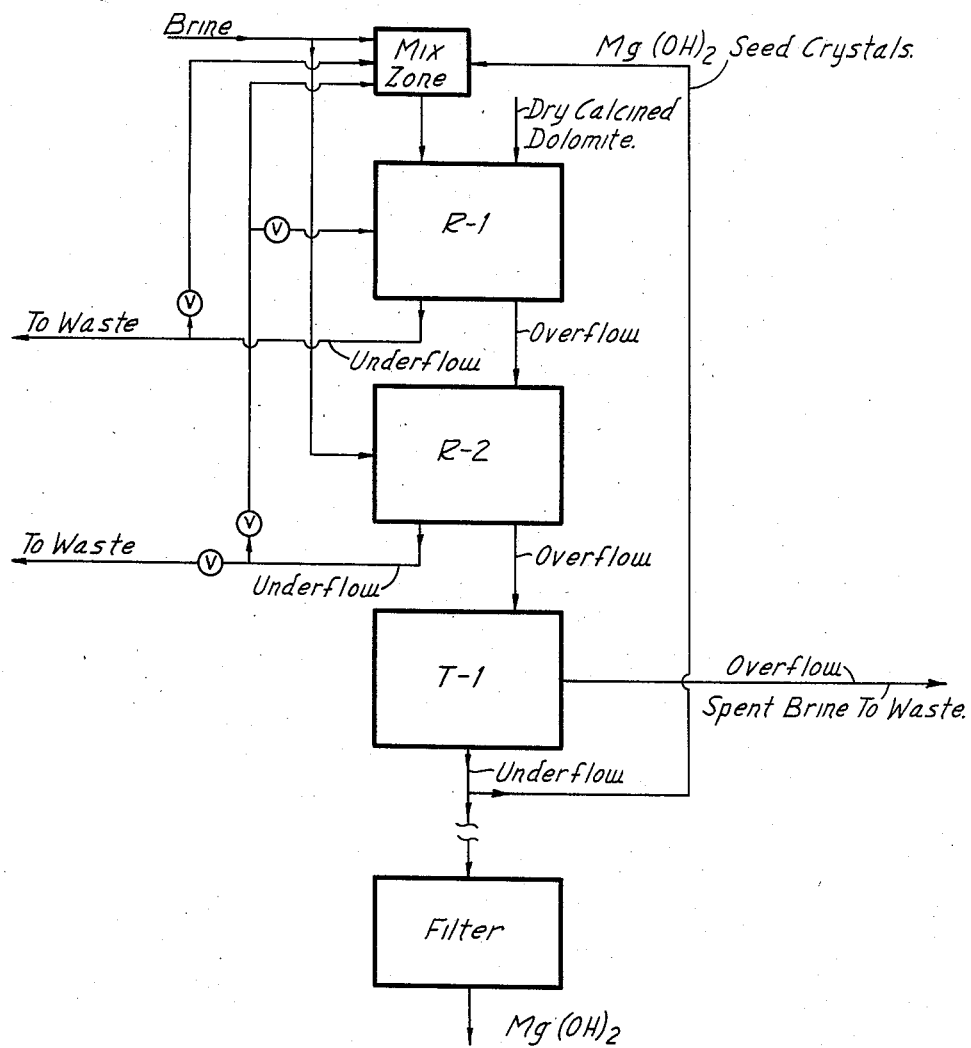
Figure 3 is another embodiment of this invention wherein there is employed dry calcined dolomite which is a decrepitating material containing larger amounts of impurities and wherein these impurities are removed as underflow from both reaction zones, and at least a portion of the underflow from the second reaction zone is returned to the mixing zone or to the first reaction zone or to both.

The crushed or ground dry calcined dolomite is admixed with the incoming brine mixture in the first reactor. The particle sizes of the dry feed can vary within wide limits, but particles which pass through a 200 mesh screen are substantially entirely eliminated from the feed prior to introduction into the reaction system. When high purity calcined dolomite is employed, it is preferably ground to a particle size of 90% passing through a 100 mesh screen. When the lower purity decrepitating dolomite is employed, it is preferably used as it comes from the calcining kiln (called "kiln-run" calcine). Such kiln-run material usually has a particle size essentially entirely passing through a ¾ inch mesh and, in accordance with this invention, retained on 200 mesh. When using the lower purity calcine it is preferred to classify, i.e. to remove the impurities, in the reaction zones as illustrated in Figure 3, and this classification has been shown also in Vettel and Israel, United States Patent 2,692,816, issued October 26, 1954.

The brine which is added in the reactor is a solution of magnesium chloride in water, such as inland brine, bittern, or by-product liquor. In addition to magnesium chloride, it will be understood that these industrial brines contain other solutes which may include other water-soluble magnesium salts. The brine is preferably employed at lower temperatures, i.e. not over 50° C., and optimum results are obtained when the brine is at about 20° to 25° C. The brine is pre-mixed, suitably in a mixing zone, with seed crystals of magnesium hydroxide, preferably in an amount of from 5 to 35 times the amount of magnesium hydroxide being precipitated in the reaction zone. These seed crystals are finely divided and can be added from any desired source. However, it is useful and economical to recycle a portion of the underflow from the thickener to the incoming brine, that is, to employ as seed crystals magnesium hydroxide previously produced in this operation. The lower amounts of seed, within the above range preferred, that is from 5 to 20 times the amount of $Mg(OH)_2$ being precipitated, when operating with hard burned or shaft kiln-fired high purity dolomite; whereas the higher amounts, within the above range, that is, from 20 to 35 times, are preferred when operating with a more active calcine such as Natividad dolomite calcined at 1100° to 1200° C.; although other amounts within the range of 5 to 35 times can be employed with either kind of dolomite, if desired.

The brine, with which there has been admixed seed crystals as described, is introduced into the first reaction zone in less than the amount necessary to react stoichiometrically with the calcined dolomite which is also added in the first reaction zone. It has been found that if substantially 100% of the brine is added in this zone, and if excess magnesium ion is present therein, the dry feed forms clumps or balls upon introduction to the mixture and an appreciable amount of such feed tends to pass out of the reaction system without reacting with the brine. This not only represents an economic loss, but results in contamination of the magnesium hydroxide product, especially in that the lime content thereof is increased. It appears from observation of these clumps or balls, which may be as large as will be retained on a 10 mesh screen, that a hard or cementitious coating forms on them which is believed to be an oxychloride and which impedes or prevents further reaction of such coated material. The result is that the solid material passes out of the system and is recovered with the product, and in such event the CaO content is increased and may be as high as 2 or 3% or more. The present process avoids this difficulty by adding less than the stoichiometric amount of brine in the first reaction zone, thereby providing a low magnesium ion content in that zone. For instance, the effluent liquid or spent brine from that zone contains preferably less than 0.1 gm. $Mg^{++}$, calculated as MgO, per liter. It has been observed that when the $MgCl_2$ is added in the first zone in less than the stoichiometric amount, preferably from 85% to 99% thereof, the dry feed disperses very readily. In one test it has been noted that the unreacted dolomite in the first reaction zone, after 7 hours of operation of a continuous process, was equivalent to the amount thereof added in the last six minutes of operation, under the conditions of this invention.

The product effluent from the first reaction zone comprises magnesium hydroxide crystals suspended in the reacted brine and also suspended unreacted calcined dolomite. The effluent is conducted to the second reaction zone and the remaining brine, required to react stoichiometrically with the unreacted calcined dolomite, is introduced into the second reaction zone and thoroughly intermixed with the product effluent from the first zone. The agitation in the second zone is preferably less vigorous than that in the first zone. In the second zone, a minor amount of brine is added, preferably from 1% to 15% of the total brine employed. This increment of brine reacts with the remaining unreacted dolomite producing a further precipitate of magnesium hydroxide, and the product effluent from this second zone is substantially free of soluble magnesium ion. The product effluent from the first reaction zone contains substantially all of the solids of finer size. When classification and purification are effected in the reactor, the larger pieces of unreacted solid feed, containing siliceous impurities and overburned ore, are withdrawn as underflow from the first reaction zone and are discarded. The product effluent is taken off as overflow. Similarly, in the second reaction zone the product effluent goes off as overflow and the impurities-enriched underflow containing some unreacted calcined dolomite is withdrawn and preferably returned to the first reaction zone. This second-mentioned zone underflow is in such practice sent to waste at intervals or otherwise classified to maintain the silica content at 25% of the underflow solids.

It is especially advantageous to maintain the solids content of the product effluents in the reactor system at not over about 150 grams per liter, calculated as MgO. The solids content can increase above this but the suspension then becomes much thicker and more viscous. It is more difficult to disperse the solid feed reactant in the suspension and to effect rapid and complete reaction. It is advantageous, therefore, to maintain the solids content at not over 150 grams/liter, as stated above. The solids content is at least 40 grams per liter, calculated as MgO.

The product effluent from the second reaction zone is conducted to a settling zone, or a thickener. In this zone the suspension or effluent is stirred slowly, for example by slowly rotating rakes. The crystalline precipitate settles and is withdrawn at the base of the thickener, while the spent brine is withdrawn as overflow. The product can alternatively be thickened in a series of settling zones, in which case wash water is introduced into the last such zone and flows through the series of settling zones or thickeners counter-current to the flow of magnesium hydroxide product sludge or slurry, finally going off as overflow with the spent brine in the second thickener. The settled and washed magnesium hydroxide sludge is conducted to a filter and there dewatered.

The product effluent from the second reaction zone settles very readily to a dense sludge. The product going to the thickener is substantially free of active lime; and the washed, filtered, and ignited product is usually found to contain less than 1% lime, as will be shown in the examples below. It has been known heretofore to make from brine magnesia containing less than 3%, or less than 2%, CaO but the present invention enables consistent production of magnesia containing less than 1% CaO, and of excellent settling and filtering characteristics. It has also been observed by applicants that the product settles and filters much more efficiently when there is neither an appreciable amount of free lime nor a substantial excess of Mg ions in the liquid effluent from the second reaction zone. Sufficient CaO is provided to react substantially stoichiometrically with the $MgCl_2$ provided by the brine; or, in other words, to react with 99 to 100% of such $MgCl_2$. In this manner, 5 day densities of up to 503 gms. MgO per liter have been obtained by the present process. Such densities are determined by placing in a 100 cc. graduated cylinder, 100 cc. of a suspension containing 100 gms. $Mg(OH)_2$, calculated as MgO, per liter. The whole is allowed to stand without shaking for 5 days at the end of which time the solids content of the settled layer of sludge is determined, calculated as MgO per liter. The filtration rate of the washed product is excellent in the present process and has reached a pick-up rate on the filter of 192 gm. $Mg(OH)_2$ per 0.1 sq. ft. per minute. Over a five-day period, in one series of tests, the 5-day density averaged 475 gm. per liter as MgO, and the pickup, or rate of deposit on the filter, 130 gms. $Mg(OH)_2$ per 0.1 sq. ft. per minute. This enables a greatly increased daily output with existing plant facilities.

The product is of such crystal structure and characteristics that it is easily washed on a rotary vacuum filter, preferably by applying a water wash to about 10 to 15% of the filter surface. It has been found, in addition, that filter cake obtained by the present invention exhibits the phenomenon of dilatancy, that is, the cake becomes liquid upon application of pressure and gives up a further amount of water upon the release of such pressure and the application of vacuum. Therefore, a very high solids cake is obtained according to the present process by applying pressure intermittently thereto. Suitably, such pressure is obtained by applying paddles or flaps at the surface of the cake, preferably as the filter rotates beyond the washing zone. In this manner, filter cakes have been obtained containing up to 70% solids, which is very advantageous in that much less water must be removed in drying, whether it be desired to produce dry $Mg(OH)_2$ or to calcine to form MgO. Fuel costs are greatly reduced thereby.

It is a special advantage of the present invention that the magnesium hydroxide precipitate settles very rapidly to a dense sludge or suspension. It is also an advantage that the magnesium hydroxide which is produced has very low lime content, usually less than 1% on the ignited basis. Still further advantages are that the magnesium hydroxide sludge filters very rapidly, can be washed on the filter, and yields a cake of very high solids and low water content.

Figure 1:
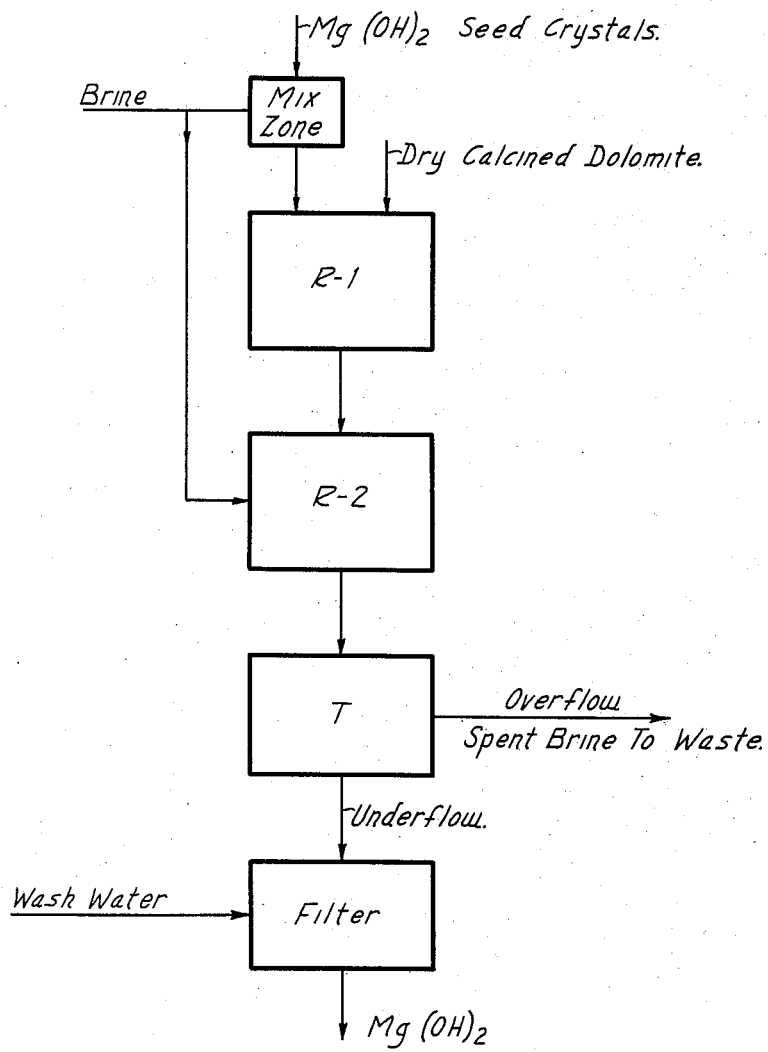
Figure 1 is a flowsheet setting forth steps of one mode of carrying out the present process.
Figure 2:
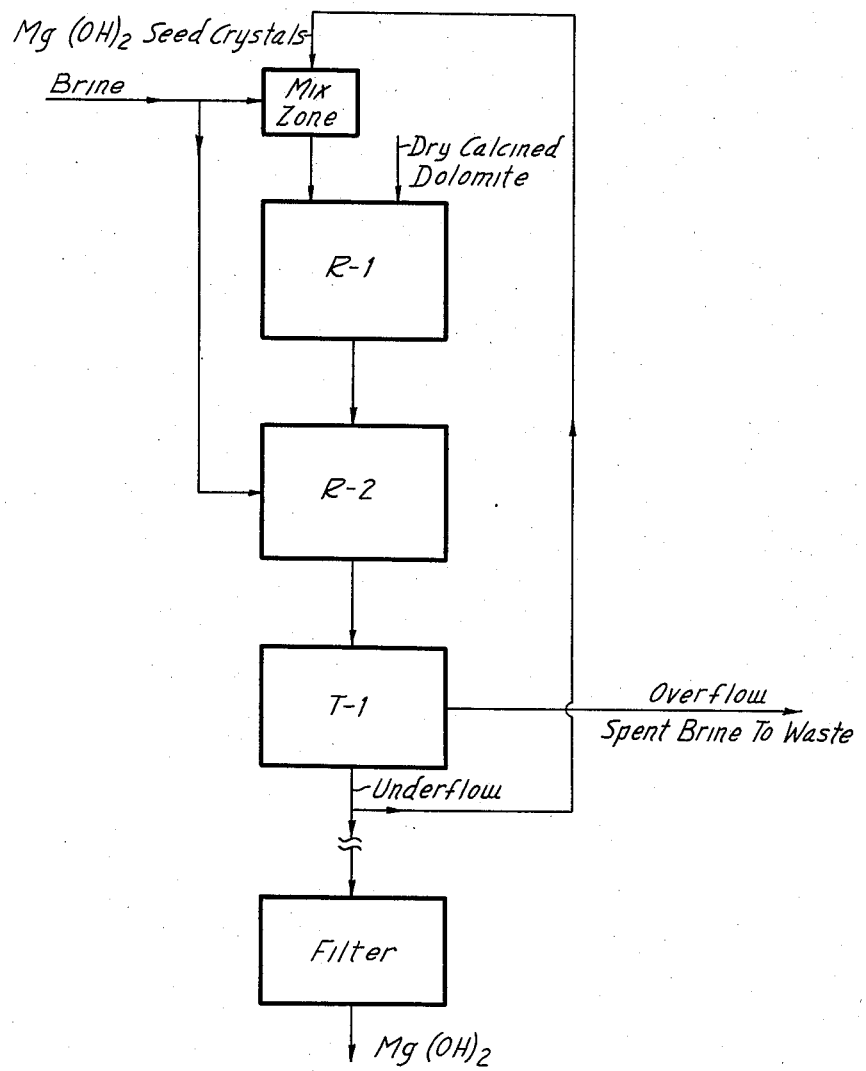
Figure 2 is a further flowsheet showing a variation of the process of the invention wherein seed crystals are returned to the mixing zone from the thickener underflow, and wherein a series of any desired number of thickeners is indicated by the break in the line between the thickener and the filter.

The flowsheet diagrams of Figures 1, 2 and 3 of the drawings illustrate various modes of practicing the present invention. In the diagram of Figure 1, brine and $Mg(OH)_2$ seed crystals from any desired source are mixed in a mixing zone and the mix is then sent to the first reactor where dry calcined dolomite is also introduced and the whole vigorously agitated. This mode of operation is particularly adapted to the use of high purity dolomite. The product effluent containing $Mg(OH)_2$ and unreacted calcined dolomite suspended in brine which has been substantially exhausted as to Mg ion content, is withdrawn to the second reaction zone, where there is added the remaining brine necessary to react substantially stoichiometrically with the calcine feed. This mix is agitated more gently, and the product effluent goes to a thickener where the solid product is settled with gentle stirring. The settled sludge is then withdrawn, filtered and washed with water on the filter, and purified $Mg(OH)_2$ is recovered.

Figure 4:
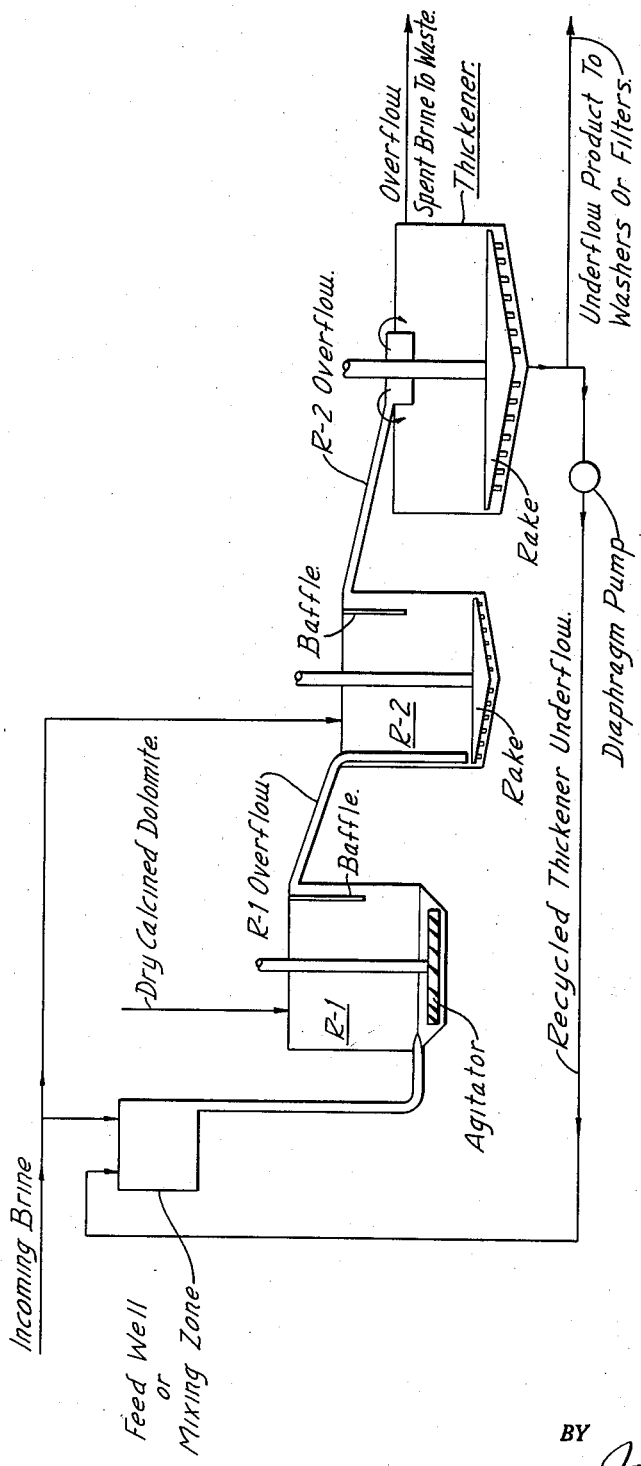
Figure 4 shows in a schematic manner a suitable arrangement of devices for carrying out the process according to this invention, especially the embodiments shown in Figure 2.

In the flowsheet of Figure 2, the operation is the same as that of Figure 1, except that the $Mg(OH)_2$ seed crystals are provided by recycling a portion of the thickener underflow to the premixing zone. Also, there is provision in this scheme for more than one thickener because a series of two or three thickeners provides an economical washing system by countercurrent flow, using a minimum amount of wash water, and at the same time ensures maintenance of adequate inventory, or total solids content, in the continuous system. Figure 4 shows an arrangement of devices suitable for carrying out the embodiment of Figure 2, wherein incoming brine and seed crystals provided by recycled thickener underflow are mixed in the feed well or mixing zone and this mixture then introduced into the first reactor, R–1, where dry calcined dolomite is added and the whole vigorously stirred by means of an agitator. The agitator is actuated by conventional means, not shown. The reacted slurry is removed as overflow, a baffle means being suitably provided around the overflow outlet to prevent short-circuiting of dry feed. The slurry overflow is introduced into the second reactor, R–2, and a minor portion of the total brine required for reaction of the lime of the dolomite is added in this reactor; and the whole is rather gently agitated, as by the rake shown, which is actuated by conventional means, not shown. The reacted slurry from R–2 is withdrawn as overflow, the overflow outlet being protected by a suitable baffle, and is introduced to the thickener where it is gently stirred by means of a rake, settled and withdrawn as underflow, the spent brine going to waste, as overflow. The settled sludge which is withdrawn is in part returned as seed to the reaction system; and as product goes to a series of washing thickeners and thence to a filter, or it can be directly filtered, the filter and thickeners not being shown.

The diagram of Figure 3 illustrates the mode of operation when there is employed a kiln-run calcined dolomite of higher impurity content, such as the Natividad dolomite described hereinabove. In this embodiment, an impurities-enriched underflow containing rather large particles high in silica and lime are removed as underflow from the first reaction zone and are sent to waste. Agitation is very vigorous in this zone. The product effluent overflow is sent to a second reaction zone wherein agitation is less vigorous and is sufficient to permit settling of an impurities-enriched fraction (which contains also some unreacted calcine feed), which is removed as underflow. This underflow is maintained at such concentration that less than 25% of the total solids thereof is silica and this can be controlled in one manner by sending a portion continuously to waste; or alternatively by sending a portion to waste when the silica content reaches this value. The remainder of this second underflow which is not sent to waste is returned to the mixing zone. The product overflow goes to a thickening and washing zone or zones. Magnesium hydroxide seed crystals are provided by recycling underflow from the thickener to the mixing zone; and if desired a portion of this underflow can be recycled to the first reaction zone. Additional incoming brine is introduced into the second reactor to maintain the magnesium ion content of the product overflow therefrom at not over about 0.1 gm.

per liter calculated as MgO. The other steps in this embodiment are the same as those in Figure 2.

The following specific examples will illustrate more clearly various modes of carrying out the process of the present invention.

EXAMPLE 1

In this example, the process is carried out according to the scheme of Figures 2 and 4. A brine containing 32.0 gms. $MgCl_2$ per liter is continuously introduced into the mixing zone and is there mixed with seed crystals of $Mg(OH)_2$ in amounts shown in Table I. This admixture is then conducted to the first reaction zone and is there mixed with dry calcined dolomite which is described below. Sufficient calcined dolomite is added to react substantially stoichiometrically with the total $MgCl_2$ of the brine added in the first and second reactors. After vigorous stirring in the first reactor, the product effluent is sent to the second reactor, and more brine is added therein. The respective amounts of brine added in the two reactors are shown in Table I. The dry reactant employed in this example is a dolomite obtained from the deposit at Woodville, Ohio, and has the following analysis, on the ignited basis: 58.40% CaO, trace SrO, 0.16% $SiO_2$, 0.08% $Fe_2O_3$, 0.05% $Al_2O_3$, 0.26% $SO_3$ and 41.05% MgO (by difference). The dolomite is calcined by heating in a rotary kiln at about 1250° C. and is then ground until 90% passes through a 100 mesh screen. The operating conditions and results are set forth in Table I. The test is run for a total time of 7 days, analyses of the operations being run at the intervals shown in the table.

nesium hydroxide recovered contained from 0.73% to 0.89% CaO.

Other tests have been run wherein a portion of the brine is added in the reactor (R) and the remaining part of the brine required to react stoichiometrically with the calcined dolomite is added in the thickener (T). The brine and dolomite are the same as in Example 1. Table II, wherein the units a, b, c, d are the same as in Table I, shows a comparison between runs A and B wherein the complement of brine is added in the thickener (T); and a run C wherein this brine is added according to the present invention in the second reaction zone (R-2).

*Table II*

| Test | Reactor Overflow | | Brine Added a | | Seed Ratio b | Filtration | | Settling Test, 5-Day Density, gms. MgO/l. |
|---|---|---|---|---|---|---|---|---|
| | Solids Content, gms. MgO/l. | $Mg^{++}$, gms. MgO/l. | R | T | | Pick-Up c | Solids, Percent d | |
| A | 105 | 0.00 | 92 | 11 | 13.6 | 102 | 49.1 | 278 |
| B | 130 | 0.1 | 104 | 11.5 | 19.7 | 126 | 49.2 | 304 |
| | | | R-1 | R-2 | | | | |
| C | 109 | 0.1 | 96 | 11 | 15.7 | 254 | 55.2 | 372 | a Parts by volume per minute.
b Grams seed/gram $Mg(OH)_2$ (calculated as MgO) being precipitated.
c Grams $Mg(OH)_2$/0.1 sq. ft./min.
d Percent solids in filter cake recovered.

It can be seen that the solids content of the filter cake does not reach 50% solids in either test where the additional brine is added in the thickener, even with the greater seeding in B, whereas the filter cake solids content is somewhat above 55% upon adding the brine in the second reactor. Likewise, the settling characteristics of the test C product is much improved over that of tests A or B. It has been applicants' observation that high solids filter cakes, of up to 70% solids, content, are obtained by adding the increment of brine in the second reaction zone and that the solids content so obtained always exceeds what is obtainable by adding brine in the thickener. Also, to obtain the improved settling, the brine must be added ahead of the thickener.

EXAMPLE 2

In this example, the dry reactant employed is the same dolomite as used in Example 1, except that it is hard-burned by firing in a shaft kiln and has after firing an

*Table I*

| Days Run | Reactor Overflow | | Brine Added a | | Seed Ratio b | Filtration | | Settling Test, 5-Day Density, gms. MgO/l. |
|---|---|---|---|---|---|---|---|---|
| | Solids Content, gms. MgO/l. | $Mg^{++}$, gms. MgO/l. | R-1 | R-2 | | Pick-Up c | Solids, Percent d | |
| 1 | 110 | 0.1 | 92 | 12 | 19.7 | 192 | 48.9 | 355 |
| 2 | 135 | 0.1 | 94 | 11 | 23.1 | 182 | 51.8 | 370 |
| 3 | 130 | 0.05 | 93 | 12 | 21.1 | 135 | 52.5 | 385 |
| 4 | 140 | 0.00 | 98 | 12 | 23.7 | 132 | 54.0 | 413 |
| 7 | 150 | 0.15 | 95 | 12.5 | 22.3 | 139 | 55.3 | 432 | a Parts by volume per minute.
b Grams seed/gram $Mg(OH)_2$ (calculated as MgO) being precipitated.
c Grams $Mg(OH)_2$/0.1 sq. ft./min.
d Percent solids in filter cake recovered.

The average 5-day density in the above continuous run is 391 grams per liter, calculated as MgO. The magnesium hydroxide recovered contained ignition loss of not over 0.5%. The operating conditions and the results are shown in Table III. The process steps and the brine are the same as in Example 1. The units a, b, c, d employed are the same as in Table I.

Table III

| Days Run | Reactor Overflow—Solids Content, gms. MgO/l. | Brine Added [a] | | Seed Ratio [b] | Filtration | | Settling Test, 5-Day Density, gms. MgO/l. |
|---|---|---|---|---|---|---|---|
| | | R-1 | R-2 | | Pick-Up [c] | Solids, Percent [d] | |
| 1 | 40  | 105 | 4 | 7.1  |     | 59   | 359 |
| 2 | 100 | 104 | 4 | 15.4 | 84  | 60.8 | 402 |
| 3 | 112 | 111 | 4 | 15.3 | 118 | 59.8 | 392 |
| 4 | 115 | 110 | 9 | 17.5 | 121 | 59.3 | 380 |
| 5 | 125 | 104 | 9 | 15.7 | 112 | 59.7 | 350 |

[a] Parts by volume per minute.
[b] Grams seed/gram Mg(OH)$_2$ (calculated as MgO) being precipitated.
[c] Grams Mg(OH)$^2$/0.1 sq. ft./min.
[d] Percent solids in filter cake recovered.

In this series of tests the magnesium ion, Mg$^{++}$, content of the reactor overflow does not exceed 0.1 gm. per liter, calculated as MgO.

The magnesium hydroxide product obtained had the following analysis on the ignited basis: 0.62% CaO, 0.19% SiO$_2$, 0.08% Fe$_2$O$_3$, 0.04% Al$_2$O$_3$, 0.05% B$_2$O$_3$, 0.08% Cl and 98.94% MgO (by difference).

EXAMPLE 3

Dolomite is employed having the following analysis on the ignited basis: 56.80% CaO, 1.14% SiO$_2$, 0.21% Fe$_2$O$_3$, 0.36% Al$_2$O$_3$, 0.012% MnO, 0.005% P$_2$O$_5$, 0.03% SO$_3$, 41.443% MgO (by difference). The dolomite is crushed and is then calcined in a rotary kiln at an average temperature of 1260° C. to an ignition loss of 0.5%. It is then reacted with brine containing 30 grams MgCl$_2$ per liter by the process steps of Example 1. In the present example, however, the brine feed to the first reactor is from 110 to 120 parts by volume per minute; and to the second reactor it is from 10 to 18 parts by volume per minute. Seed ratio is maintained at 20 to 25 gms./gm. of MgO being produced in the reactor and the 5-day density in such operation is from 325 to 345 gram/liter as MgO, with a filter pick up of from 85 to 105 gms. Mg(OH)$_2$ per 0.1 sq. ft. per min. and cake solids of from 57 to 59.6%. By applying 2 cycles of alternate mechanical pressure and vacuum during filtration, the cake solids content is increased to 65%. The product contains from 94.3 to 96.24% MgO and 1.25 to 1.85% CaO on the ignited basis. When the starting dolomite is calcined to a higher ingition loss, i.e. is more active and less hardburned, the CaO content of the magnesium hydroxide produced decreases to less than 1% on the ignited basis. Alternatively, a higher purity product is obtained when a process as shown in Figure 3 is employed, practicing classification removal of impurities in the reactor.

EXAMPLE 4

Figure 5:
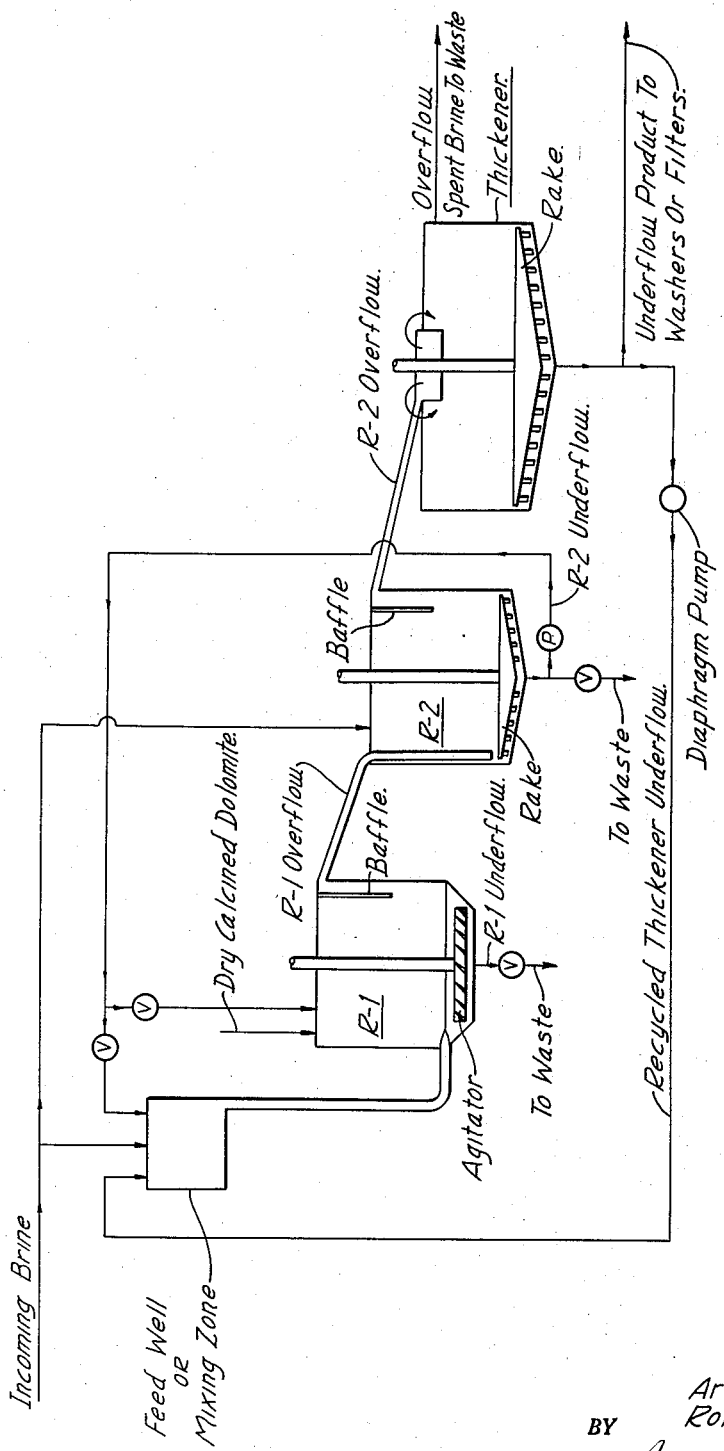
Figure 5 shows in a schematic manner an arrangement of devices suitable for carrying out the process of this invention when a decrepitating dolomite is used, for instance according to the flow sheet of Figure 3.

In this example there is employed as dry reactant decrepitating dolomite as obtained from the deposit at Natividad, California, which is prepared by crushing and then calcining at 1100–1200° C. and which has the following typical chemical analysis, on the ignited basis: 38.06% MgO, 59.66% CaO, 1.60% SiO$_2$, 0.33% Fe$_2$O$_3$ and 0.34 Al$_2$O$_3$ (0.01% traces of undetermined compounds). The calcined material is added in the reactor as it comes from the calcining zone and without grinding. The brine employed contains 47 gms. MgCl$_2$ per liter; and the calcined dolomite and brine are reacted according to the flowsheet of Figure 3, and the arrangement of Figure 5. Incoming brine is mixed with seed crystals in the feed well or mixing zone and the mixture is then introduced into the first reactor, R-1, where dry calcined dolomite is also fed in, and the whole vigorously mixed by means of the agitator. The solid particles of calcined dolomite settle downwardly through this reaction zone and the heavier portion of such particles, which is enriched in impurities (that is, it contains predominantly siliceous "rocks" or heavier particles), is withdrawn and sent to waste. In this manner, purification is effected in the first reaction zone, at least in part. The first reactor is provided with a shield or baffle adjacent the outlet for the reactor overflow, to prevent short-circuiting of the solid feed, that is, to prevent it from reporting rapidly to the overflow outlet. The material taken off as overflow is a slurry of spent brine containing unreacted feed and precipitated magnesium hydroxide. There is added in this first reaction zone only about 90% of the brine required to react with the lime of the calcined dolomite which is added, the reaction being according to the following equation:

$$CaO + MgCl_2 + H_2O = CaCl_2 + Mg(OH)_2$$

The overflow slurry is conducted to the second reaction, R-2, where there is added the remaining 10% of the brine as required for completion of the reaction of the lime mentioned. The solids content of the overflow from the reactor is 125 gms., as MgO, per liter, and there is not over 0.1 gm., as MgO, per liter of unreacted magnesium ion in the overflow. Seed is added in this system in an amount of from 25 to 28 times the amount of magnesium hydroxide being precipitated.

In the second reactor, heavier particles settle to the bottom of the reaction zone also and are withdrawn and are recirculated to the first reaction zone; at intervals, this impurities—enriched underflow is sent to waste to maintain the silica content thereof at not over 25% of its solids content. In this zone, agitation is more gentle and is effected by means of a slowly revolving rake, for instance. The overflow is substantially free of unreacted magnesium salt, the magnesium ion content not exceeding about 0.1 gm. as MgO, per liter. The overflow outlet of the second reactor is also surrounded by a shield or baffle to prevent rapid removal of the increment brine fed to this zone, without reaction of the same. The overflow which is removed from this zone is a slurry of precipitated magnesium hydroxide in spent brine, and it is introduced into a thickener where a sludge is produced in the usual way, which is then washed and filtered. The sludge has a 5-day density of 312 gms. (MgO) per liter, the pick-up on a rotary filter is 68.6 gms. Mg(OH)$_2$ per 0.1 sq. ft. filter area per minute and the filter cake obtained contains 55.5% solids.

EXAMPLE 5

In a further 2 days' run made with the brine and calcined dolomite of Example 1, except that the brine is heated to 40° C., the brine is added in the first reactor in amounts of from 109 to 118 parts by volume per minute and in the second reactor, from 3.3 to 3.5 parts by volume per minute. The seed ratio is from 18.5 to 21.9 times the amount Mg(OH)$_2$ being produced. The 5-day density of the product averages 369 gms./liter as MgO; the filter pick-up, 101 gms. per 0.1 sq. ft. per min.; and cake solids, 61.3%. The CaO content of the product (ignited basis) is from 0.62 to 0.92; and the MgO content averages over 98%.

Agitation in the first reaction zone is suitably effected by a mechanical stirring device, such as conventional rake arms mounted on a centrally disposed shaft in a reaction tank or vessel, the arms being driven by any suitable means. The desired vigorous agitation can also be effected by introducing the mixture containing incoming brine and seed tangentially into the base of the reaction zone, along with mechanical stirring, or by circulating by centrifugal pumps or by other derived means. Conventional rake arms also provide suitable agitation in the second reaction zone, where such rakes are operated less vigorously than in the first zone. Conventional thickener tanks are suitable for use in this process. Preferably, the filters employed are rotary filters of known type, wherein vacuum is employed to assist the filtration step.

In producing the highest purity and fastest settling product it is preferred to employ a seed ratio of from 12 to 20 in the reaction system. Optimum yields are obtained by employing dry calcined dolomite of the higher purity described and of such particle size that 95 to 98% passes through a 100 mesh screen. A product containing at least 98% MgO on the ignited basis is obtainable by the present process. If the starting brine contains sulfate ion, it is pre-treated, with calcium chloride or lime or calcined dolomite, to precipitate calcium sulfate before processing according to the present invention. It is preferred that the magnesium ion, Mg++, content of the thickener or the reactor overflow liquids or spent brine does not exceed 0.3 gm. per liter, calculated as MgO, in order to promote rapid and complete settling of the precipitated magnesium hydroxide and to maintain a dense sludge bed in the thickeners and washers, for example, and to reduce loss of suspended Mg(OH)$_2$ in the spent brine overflow from the thickener.

Where the dolomite is calcined in the rotary kiln, i.e. at more moderate temperatures and with production of a more active feed, it is usually suitable to add from 9% to 15% of the total brine feed, in the second reactor; whereas, when the dolomite is harder burned, at higher temperatures, e.g. in a stack kiln, it is usually preferred to add from 1% to 9% of the total brine fed, in the second reactor.

The product of the present process can be desiccated to yield dry magnesium hydroxide, or it can be calcined or fired to yield magnesia of any desired activity, in the known manner.

In this specification and claims parts and percentages are by weight except where otherwise indicated. Mesh sizes are U.S. standard screen sizes as shown on page 2797 of the Handbook of Chemistry and Physics, 32nd edition, published by Chemical Rubber Publishing Co., 1950. The brine employed in this process is from the natural or industrial sources described above, or can be any other solution of magnesium salt in water, and can contain other solutes, as previously stated. In general, the brine has a specific gravity of from 1.05 to 1.220; and the brine can contain from over 1% soluble magnesium salt up to a saturated solution thereof.

Having now described the invention, what is claimed is:

1. Process for making high purity and readily filterable magnesium hydroxide which comprises admixing incoming concentrated magnesium chloride solution with magnesium hydroxide seed crystals in an amount of from 5 to 35 times the amount of magnesium hydroxide being precipitated in a first reaction zone, then introducing into said admixture in said reaction zone high purity dry calcined dolomite of particle size not less than 200 mesh in a greater amount than will react stoichiometrically with the magnesium chloride of said solution and vigorously agitating the admixture, and causing precipitation of magnesium hydroxide, withdrawing from said reaction zone a suspension containing magnesium hydroxide and unreacted calcined dolomite, said suspension having had substantially none of the solids of finer size removed therefrom and having a magnesium ion content of not over 0.3 gram per liter calculated as MgO, said suspension containing at least 40 grams solids per liter, introducing said suspension into a second reaction zone, admixing with said suspension in said second zone a minor amount of said concentrated magnesium chloride solution sufficient to react stoichiometrically with said unreacted calcined dolomite, gently agitating in said second zone and causing reaction between said calcined dolomite and said magnesium chloride solution to precipitate a further amount of magnesium hydroxide, withdrawing from said second reaction zone spent brine containing suspended magnesium hydroxide in readily filterable state, said spent brine suspension having a magnesium ion content of not over 0.3 gram per liter calculated at MgO, and separating magnesium hydroxide from the spent brine.

2. Process as in claim 1 wherein separation of magnesium hydroxide from the spent brine includes filtration to recover magnesium hydroxide filter cake and said cake is washed with water on the filter.

3. Process as in claim 1 wherein said incoming magnesium chloride brine is at a temperature of not over 50° C.

4. Process in claim 1 wherein the total solids in the product effluent from the first mentioned reaction zone are not over 150 grams per liter, calculated as MgO.

5. Process as in claim 1 wherein the total solids in the product effluent from said second reaction zone are not over 150 grams per liter, calculated as MgO.

6. Process as in claim 1 wherein there is added in said first reaction zone hardburned calcined dolomite containing less than 1% silica, and in particle size of 90% passing through 100 mesh screen.

7. Process as in claim 1 wherein said suspension of magnesium hydroxide in spent brine is withdrawn as overflow from said second zone is, withdrawn to a filtration zone and is filtered with alternate application of vacuum and mechanical pressure.

8. Process as in claim 1 wherein said calcined dolomite is hardburned and contains less than 1% silica, and said magnesium hydroxide seed crystals are admixed in an amount of from 5 to 20 times the amount of magnesium hydroxide being precipitated.

9. In the process for making magnesium hydroxide of high purity and rapid settling wherein incoming magnesium chloride solution is mixed with magnesium hydroxide seed crystals and is reacted with dry calcined decrepitating dolomite of particle size not less than 200 mesh in a series of reaction zones, and impurities-enriched underflows are withdrawn from the reaction zones and magnesium hydroxide slurry is withdrawn as overflow from said zones, the improvement wherein concentrated aqueous magnesium chloride solution is mixed with magnesium hydroxide seed crystals in an amount of from 5 to 35 times the amount of magnesium hydroxide being precipitated in a first reaction zone, and then the mixture is vigorously agitated with said calcined dolomite in a first reaction zone, from 85% to 99% of said solution required to react stoichiometrically with said dolomite being admixed in said first zone, an overflow comprising an aqueous slurry of magnesium hydroxide crystals and unreacted dolomite in spent brine is withdrawn to a second reaction zone, the remainder of said required solution is admixed in said second zone with gentle agitation, and an overflow is withdrawn therefrom, said overflow comprising a magnesium hydroxide slurry in spent brine, the magnesium ion content of the spent brine of each said overflow not exceeding 0.3 gram per liter, calculated as MgO, and the total solids content in each reaction zone being at least 40 grams per liter.

10. Process as in claim 9 wherein said total solids content is from 40 to 150 grams per liter.

11. Process as in claim 9 wherein said magnesium hydroxide seed crystals are admixed in an amount of from 20 to 35 times the amount of magnesium hydroxide being precipitated.

12. In the process for making magnesium hydroxide of high purity and rapid settling wherein incoming magnesium chloride solution is mixed with magnesium hydroxide seed crystals and is reacted with dry calcined dolomite of particle size not less than 200 mesh in a series of reaction zones, and impurites-enriched underflows are withdrawn from the reaction zones and magnesium hydroxide slurry is withdrawn as overflow from said zones, the improvement wherein concentrated aqueous magnesium chloride solution is mixed with magnesium hydroxide seed crystals in an amount of from 5 to 35 times the amount of magnesium hydroxide being precipitated in a first reaction zone and then the mixture is vigorously agitated with calcined dolomite in a first reaction zone, said dolomite being present in amount greater than will react stoichiometrically with the magnesium chloride of said solution, an overflow comprising an aqueous slurry of magnesium hydroxide crystals and unreacted dolomite in spent brine is withdrawn to a second reaction zone, a minor amount of magnesium chloride solution sufficient to react stoichiometrically with said unreacted dolomite is admixed in said second zone with gentle agitation, an overflow is withdrawn therefrom, said overflow comprising a magnesium hydroxide slurry in spent brine, the magnesium ion content of the spent brine of each said overflow not exceeding 0.3 gram per liter, calculated as MgO, and the total solids content in each reaction zone being at least 40 grams per liter, and separating magnesium hydroxide from the overflow from the second zone.

References Cited in the file of this patent

UNITED STATES PATENTS

| | | |
|---|---|---|
| 2,493,752 | Maestri | Jan. 10, 1950 |
| 2,595,314 | Vettel et al. | May 6, 1952 |
| 2,692,816 | Vettel et al. | Oct. 26, 1954 |

FOREIGN PATENTS

| | | |
|---|---|---|
| 468,013 | Canada | Sept. 12, 1950 |
| 507,334 | Canada | Nov. 16, 1954 |